(12) United States Patent
Titchener

(10) Patent No.: US 7,033,203 B2
(45) Date of Patent: Apr. 25, 2006

(54) CONNECTOR AND COMPONENTS THEREFOR

(75) Inventor: Mark Renfrew Titchener, St Hellers (NZ)

(73) Assignee: Auckland Uniservices Limited, Auckland (NZ)

(*) Notice: Subject to any disclaimer, the term of this patent is extended or adjusted under 35 U.S.C. 154(b) by 0 days.

(21) Appl. No.: 10/979,756

(22) Filed: Nov. 3, 2004

(65) Prior Publication Data

US 2005/0164536 A1    Jul. 28, 2005

Related U.S. Application Data

(63) Continuation of application No. PCT/NZ03/00078, filed on May 2, 2003.

(51) Int. Cl.
*H01R 13/62* (2006.01)

(52) U.S. Cl. .................. 439/369; 439/191; 439/367
(58) Field of Classification Search ............ 439/367, 439/369, 371, 191, 370
See application file for complete search history.

(56) References Cited

U.S. PATENT DOCUMENTS

| | | | | |
|---|---|---|---|---|
| 1,967,021 A | * | 7/1934 | Gary | 439/677 |
| 2,190,230 A | * | 2/1940 | Cole | 439/372 |
| 2,672,594 A | * | 3/1954 | Morton | 439/369 |
| 2,916,720 A | * | 12/1959 | Steans | 439/370 |
| 3,551,879 A | * | 12/1970 | Waller | 439/369 |
| 5,399,102 A | | 3/1995 | Devine | 439/505 |
| 5,579,425 A | | 11/1996 | Lampert et al. | 385/59 |
| 5,772,462 A | | 6/1998 | Osten | 439/367 |
| 6,050,840 A | * | 4/2000 | Kowalski et al. | 439/369 |

FOREIGN PATENT DOCUMENTS

EP    0762558 B1    11/2000

* cited by examiner

*Primary Examiner*—Hae Moon Hyeon
(74) *Attorney, Agent, or Firm*—Jacobson Holman PLLC

(57) ABSTRACT

The invention relates to a connector pair (1,2), for detachably connecting two cable ends (3,4), cords, optical fibers or hoses, which will not disconnect when a pulling force is applied to a cable. For that purpose the first connector (1) is provided with at least one male coupling part (5a, 5b) and a second connector (2) is provided with at least one female coupling part (6a,6b) which are positioned in relation to the two ends in such a manner that an angle between a cable end, cord, optical fiber or hose and a pointing direction of a corresponding coupling part is an acute angle.

9 Claims, 5 Drawing Sheets

CONNECTOR AND COMPONENTS THEREFOR

This is a continuation of PCT/NZ03/00078 filed May 2, 2003 and published in English.

TECHNICAL FIELD OF THE INVENTION

The invention relates to a connector and a connector pair, for detachably connecting two ends of cables, cords, optical fibres or hoses, of which a first connector is provided with at least one male coupling part and a second connector is provided with at least one female coupling part, such that for a coupled first and second connector an electric current or a light signal or a fluid can pass the connector pair.

BACKGROUND OF THE INVENTION

Connector pairs of this kind are used in a multitude of embodiments, for domestic use and for professional applications. A problem with these connector pairs is that they often easily unplug when a pulling force is exerted to the two cable ends. For professional use, embodiments exist which are provided with more or less sophisticated locking means, but they request additional acts when a connector pair is to be engaged or disengaged. For domestic use, these embodiments are generally too expensive.

OBJECT OF THE INVENTION

It is an object of this invention to provide an improved connector or an improved connector pair which will go some way towards overcoming the above mentioned problem, or one which will at least provide the public with a useful choice.

STATEMENT OF THE INVENTION

The present invention aims at obviating these disadvantages and is characterized in that the male and the female coupling part are positioned in relation to the two ends in such a manner that a pulling force, exerted to the two ends, will change a partial coupling between the first connector and the second connector into a complete coupling. More in particular, a coupled connector pair can never become uncoupled by exerting a pulling force to the attached cable, cord or hose.

In one aspect the invention provides a first connector capable of forming part of a connector pair for detachably connecting two ends of cables, cords, optical fibres or hoses, wherein said first connector is provided with at least one coupling part capable of being connected to a second connector provided with at least one complementary coupling part, such that in use when the first connector is coupled to a second connector an electric current or a light signal or a fluid can pass the connector pair, characterized in that the coupling part is positioned in relation to the two ends in such a manner that a pulling force, exerted to the two ends, will change a partial coupling between the first connector and the second connector into a complete coupling.

Preferably a first connector has a male coupling part characterized in that an angle between the corresponding end and the pointing direction of the male coupling part is an acute angle.

More preferably a first connector is characterized in that the first connector comprises a shell, on one side operationally connected to a cord end, on substantially the opposite end provided with a nose end surface, which is split in two nose end half surfaces, one half being situated at the end of the shell and the other half being displaced toward the cord end, that both nose end halves are positioned mutually parallel and that they are connected by a base surface onto or into which the at least one coupling part is mounted substantially parallel to the nose end surface halves.

Preferably a first connector is characterised in that the first connector is situated on or forms part of a device such as an electrical tool.

In an alternative embodiment the invention provides a second connector complementary to the first connector as previously described, wherein said second connector has a female coupling part, characterised in that an angle between corresponding end and a primary direction of female coupling part is an acute angle.

In a further embodiment the invention provides a multiple connector having a plurality of sockets, characterised in that one or more of the sockets is/are second connectors as previously described, and that at least some of the sockets are connected together.

In a further aspect the invention provides a connector pair for detachably connecting two ends of cables, cords, optical fibres or hoses, of which a first connector is provided with at least one male coupling part and a second connector is provided with at least one female coupling part, such that for a coupled first and second connector an electric current or a light signal or a fluid can pass the connector pair, characterized in that the male and the female coupling part are positioned in relation to the two ends in such a manner that a pulling force, exerted to the two ends, will change a partial coupling between the first connector and the second connector into a complete coupling.

A preferred embodiment of the invention is characterized in that for the first connector an angle between the corresponding end and a pointing direction of a male coupling part is an acute angle. In this way, a very simple construction is obtained in which the male coupling part is pulled into the female coupling part when a pulling force is exerted to an attached cable.

A further preferred embodiment of the invention is characterised in that a connector comprises a shell, on one side operationally connected to a cord end, on substantially the opposite end provided with a nose end surface, which is split in two nose end half surfaces, one half being situated at the end of the shell and the other half being displaced toward the cord end, that both nose end halves are positioned mutually parallel and that they are connected by a base surface onto or into which the at least one coupling part is mounted substantially parallel to the nose end surface halves.

The invention also relates to a connector, fit to be used as part of an inventive connector pair.

The invention relates more in particular to an electrical cord connector or coupling socket, fit to be used as part of an inventive connector pair and to an, apparatus, provided with a connector, fit for being connected to a connector according to the invention. Examples include power tools, multi-sockets, and power points.

DRAWINGS

The invention will now be further explained with a reference to the following figures, in which:

FIG. 1 schematically shows in side view a possible embodiment of a first and a second connector for connecting two cables;

FIG. 2 schematically shows this embodiment in a connected situation;

FIG. 3A schematically shows connector 1 of this embodiment in top view;

FIG. 3B schematically shows connector 2 of this embodiment in top view;

FIG. 4A schematically shows a connector and an apparatus to be connected;

FIG. 4B schematically shows a connector and an apparatus in a connected situation;

FIG. 5 schematically shows in side view a possible embodiment of a first and a second connector for connecting two hoses;

FIG. 6 schematically shows in side view an alternative embodiment of a first and a second connector for connecting two hoses;

FIG. 7 schematically shows in side view a possible embodiment of a first and a second connector for connecting two bundles of optical fibres.

FIG. 8 schematically shows in side view a possible embodiment of a first connector forming part of the handle of an electric drill, and a second connector having a power cord attached thereto for the provision of power to the electric drill;

Figure 1:
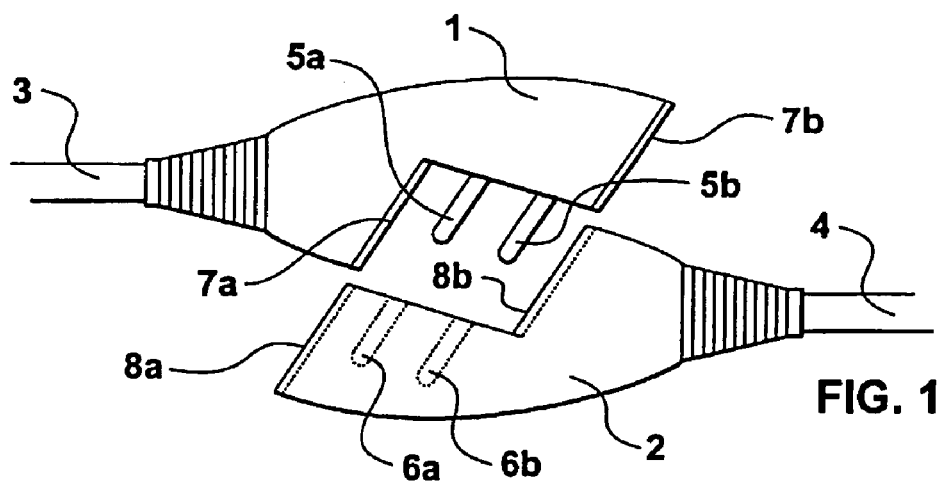

FIG. 1 schematically shows in side view a possible embodiment of a first connector 1 and a second connector 2 for connecting two cables 3,4. First connector 1 is provided with male coupling parts 5a,5b, and second connector 2 is provided with female coupling parts 6a,6b, of a type well known in the art. Both connectors can be coupled easily, by sliding the male coupling parts into the corresponding female coupling parts. Because of the particular position of the coupling parts with respect to the cables 3,4, it is evident that when one exerts a pulling force on the cables 3,4, the coupling of both coupling parts will become more complete, if possible. This is because a pulling force on a cable will be resolved in a force perpendicular to the coupling parts and a force parallel to the coupling parts and this latter force pulls both connectors together.

Connector 1 and connector 2 each comprise an outer shell made of for example a durable synthetic material, which is filled with a more flexible synthetic material, in which the wiring is embedded (not shown in the figure). Alternatively, connector 1 and connector 2 may be moulded round the coupling parts and the wiring, as usual in the art.

If desired, connector 1 may be provided with ribs 7a,7b and connector 2 with complementary grooves 8a,8b, for example v-shaped or dovetail shaped, which add to the guidance of the connector parts and/or assist in the physical binding of the connectors, and which also reduce the sheer on the connector parts.

The embodiment shown here comprises two rows of cylindrical male connector parts. Obviously, one may use male coupling parts with any cross section and in any arrangement. More in particular, one may use coupling parts of the so-called coaxial type, for transporting high frequency signals. It is also possible to provide a connector with mixed male and female coupling parts.

Figure 2:
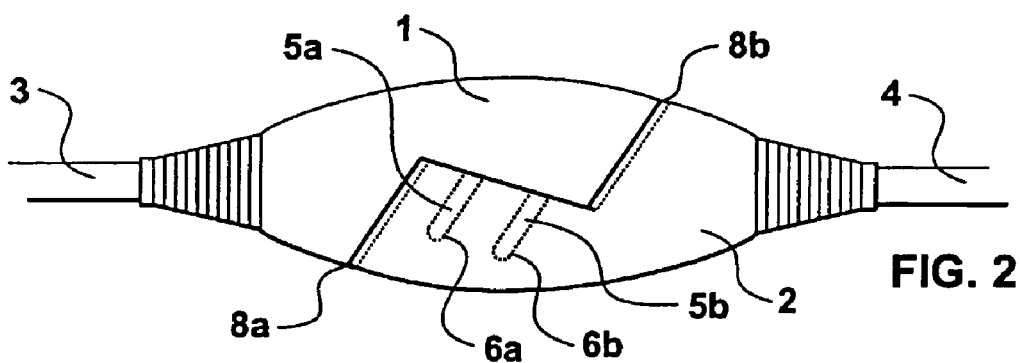

FIG. 2 schematically shows this embodiment in a connected situation in which male coupling parts 5a, 5b are completely shifted into female coupling parts 6a, 6b.

Figure 3A:
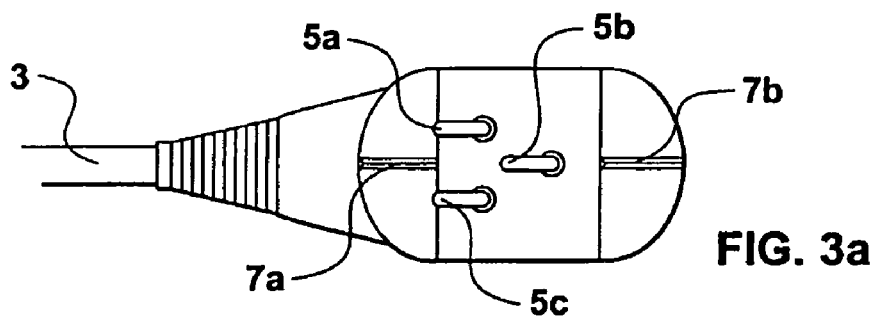

FIG. 3A schematically shows this embodiment in top view, with connector 1 with male coupling parts 5a, 5b, 5c.

Figure 3B:
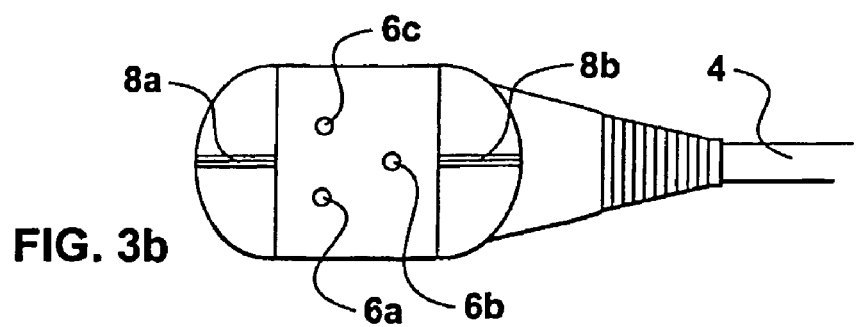

FIG. 3B schematically shows connector 2 with female coupling parts 6a, 6b, 6c. Coupling parts 5a, 5c are for example for connecting to the mains voltage, while coupling part 5b, which is slightly longer, is for connecting to ground.

Figure 4A:
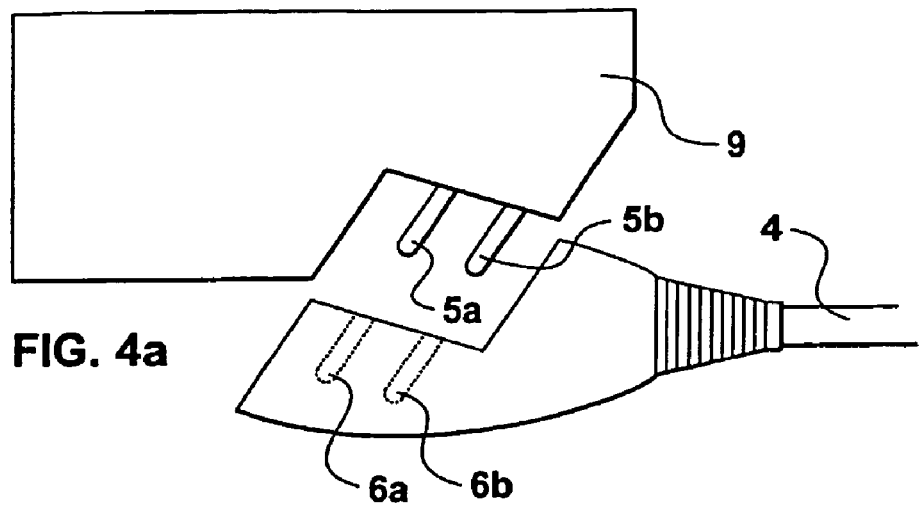
Figure 4B:
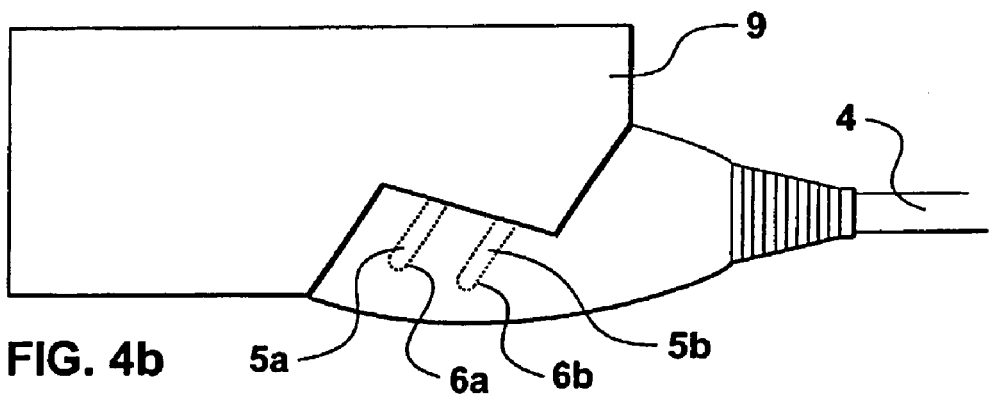

FIG. 4A schematically shows a connector 2 and an apparatus 9 to be connected, in which apparatus 9 is provided with male coupling parts 5a, 5b, which match with connector 2 and its female coupling parts. FIG. 4B schematically shows connector 2 and apparatus 9 in a connected situation, in which it is virtually impossible to disconnect connector 2 by pulling cable 4.

Figure 5:
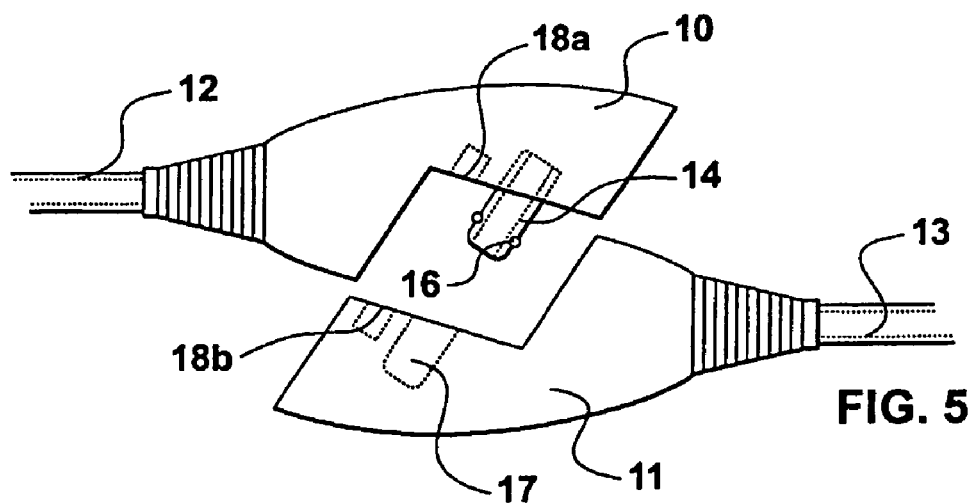

FIG. 5 schematically shows in side view a possible embodiment of a first connector 10 and a second connector 11 for connecting two hoses 12, 13. For that purpose a hollow coupling part 14 is mounted into connector 10, which is internally connected to hose 12 and a recess 17 is made in connector 11, which is internally connected to hose 13. Coupling part 14 can slide into recess 17, with an o-ring 16 providing a hermetic seal. Now a liquid or a gas can be transported through the connector pair, while it is virtually impossible to disconnect the connector pair by applying a pulling force to the hoses. If desired, two magnets 18a, 18b can be included in first connector 10 and a second connector 11, which will keep the connectors in a connected situation even when a pressurised liquid or gas is transported. Preferably they are electro-magnets which are remotely activated. Alternatively permanent magnets would be used in this or other connector versions.

Figure 6:
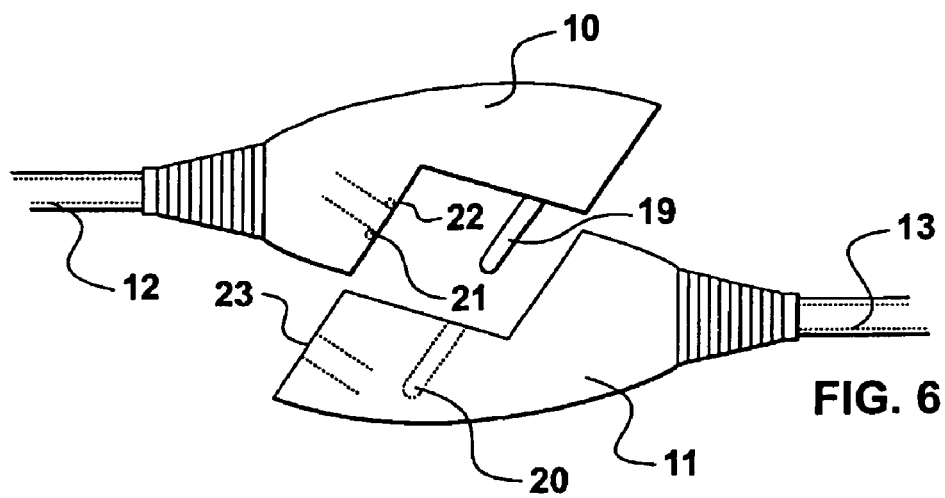

FIG. 6 schematically shows in side view an alternative embodiment of a first connector 10 and a second connector 11 for connecting two hoses 12,13. In this case, a male coupling part 19 and a female coupling part 20 are merely used for mechanically aligning first connector 10 and second connector 11 according to the invention. Hose 12 now is connected to a recess 21, which is surrounded by an O-ring 22 and hose 13 is connected to a recess 23, which recesses join when first connector 10 and second connector 11 are put into place. When joined, O-ring 22 provides a hermetic seal and a liquid or a gas can be transported through the connector pair, while it is virtually impossible to disconnect the connector pair by applying a pulling force to the hoses.

Figure 7:
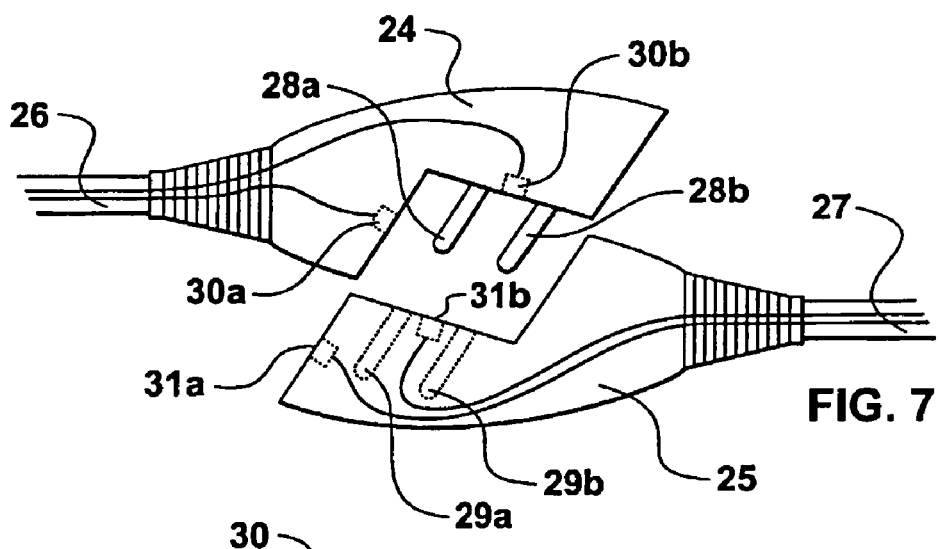

FIG. 7 schematically shows in side view a possible embodiment of a first connector 24 and a second connector 25 for connecting two bundles 26,27 of optical fibres, in this example each comprising only two fibres. The mere function of male coupling parts 28a,28b and female coupling parts 29a,29b is to mutually position first optical systems 30a,30b to second optical systems 31a,31b, which optical systems are as such well known in the art, and to prevent the coupling from being disrupted when a pulling force is applied to the bundles of optical fibres. Bundles 26,27 may also comprise electrical wires, for example supply voltages for optical amplifiers. In that case, male coupling parts 28a,28b and female coupling parts 29a,29b can be used for connecting these wires.

Figure 8:
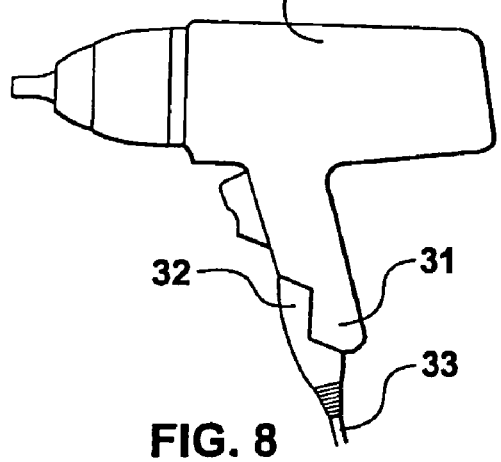
Figure 9:
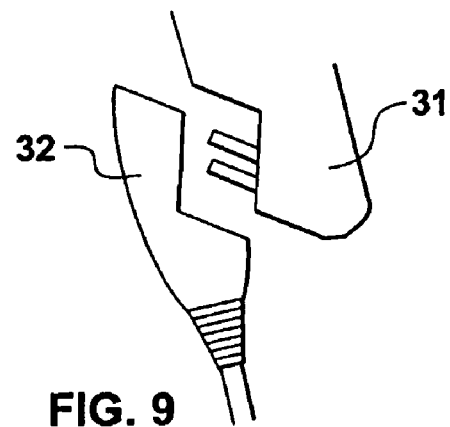
FIG. 9 shows a close up side view of the connection of FIG. 7.

FIGS. 8 and 9 show an arrangement in which a electrical connection is made between a power cord 33 and a power tool 30 such as an electric drill, in which the male part 31 is formed integral with the handle of the power tool 30, and the female part 32 is connected to a power cord 33 so that when the two are connected together a pulling force on the power cable will cause the male and female parts to be securely brought together.

Figure 10:
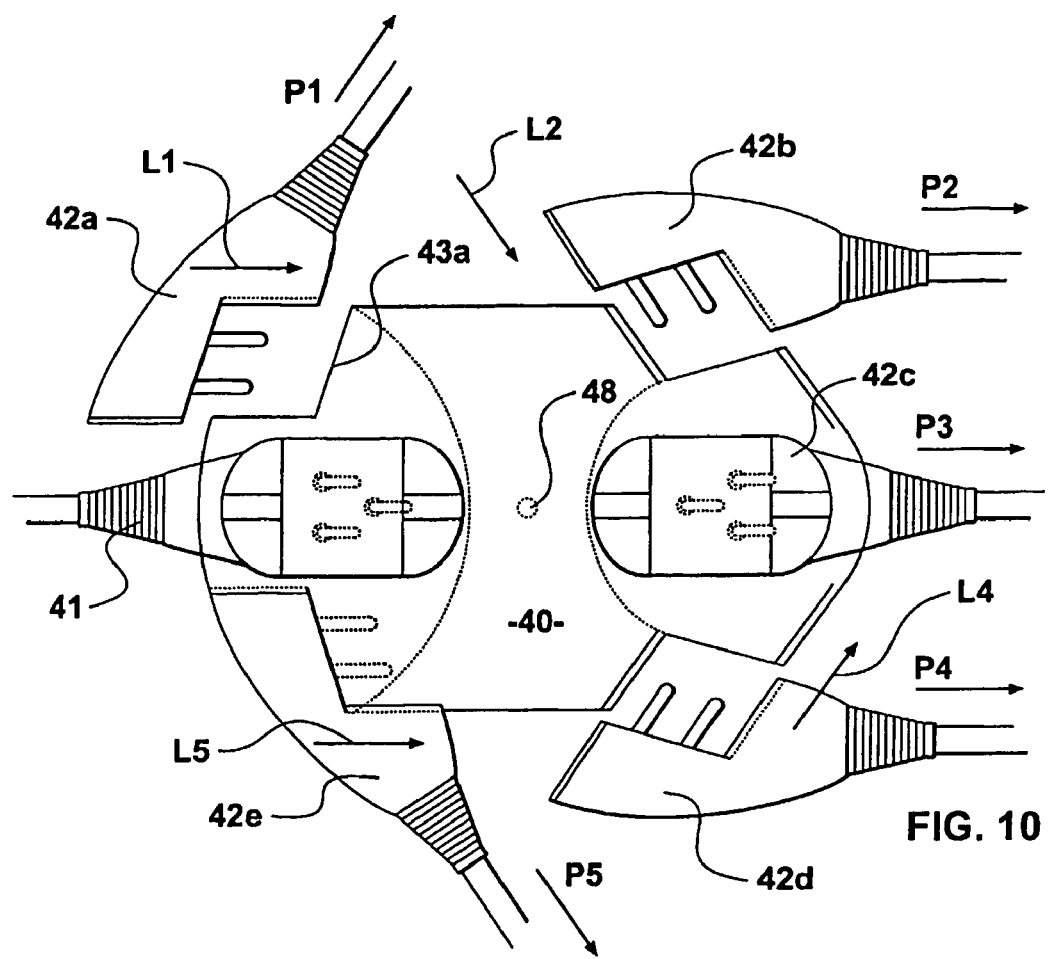
FIG. 10 shows a multi socket in top plan view enabling a number of power cords to be connected to the multi socket, to enable power to be distributed to a number of different outlets.
Figure 11:
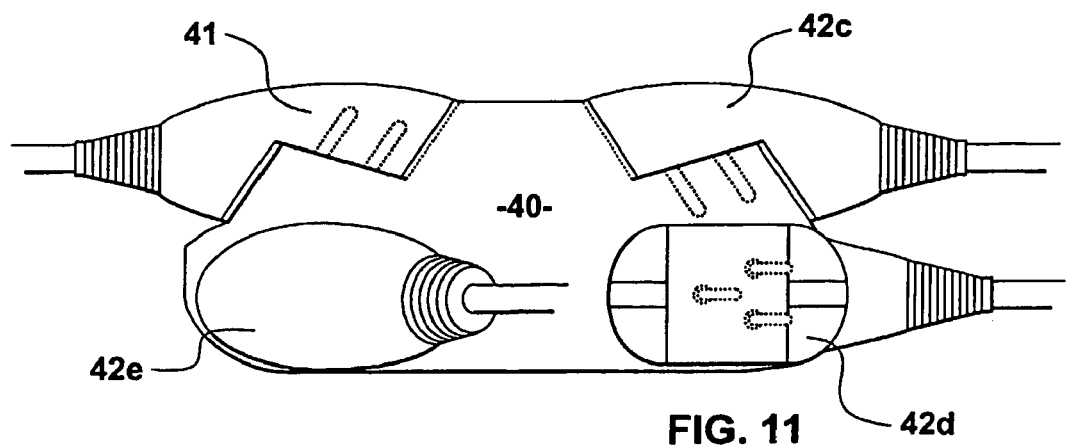
FIG. 11 is a side plan view of the multi socket of FIG. 9.

FIGS. 10 and 11 show a multi socket device 40 in this case a five-way power block. It may include a safety cutout and reset pin 48 as is usually provided on such devices. Preferably it has a series of female sockets 43A etc, each of which is complementary to male parts 41 42A, 42B, 42C, 42D and 42E, connected to power cords. As shown in FIG. 9 the "supply in" 41, at the centre left of the top plan view, and the output sockets 43A etc, enable power to be distributed to outgoing power cords as shown by five outlets.

The pulling force on the power cable is shown by the various arrows marked P1, P2, P3, P4 and P5 along the cords. It will be evident that the construction is similar to that shown in the previous drawings, that a pulling force on each cord will cause its male part to be securely pulled into contact with the corresponding female part, as force P1 translates into a component L1 to pull the parts together and improve the contact between the respective pins and sockets.

In this embodiment the five outlets 43A etc can be connected directly to the input socket, so the power is distributed to whichever outlet is connected to a male part 42A etc. However it will be appreciated that a multi socket device could be designed to connect a male or female part of this invention with a socket and plug of a different style, so it acted as a conversion device between the connector pair of this invention, and some other connector pair, for example a standard three pin or two pin connection used on existing products. There are a number of different standards of connector pairs used around the world, and during any transition phase it may be desirable to have a translation device which allows the connector pair of this invention to be interconnected with a connector pair of some other style. In addition, or alternatively, it may also be desirable to connect some of the sockets in the multi socket to designated output sockets, so that the device may provide connections between different cables, without all of them sharing the common connection as is the case in FIG. 10 and 11.

Figure 12:
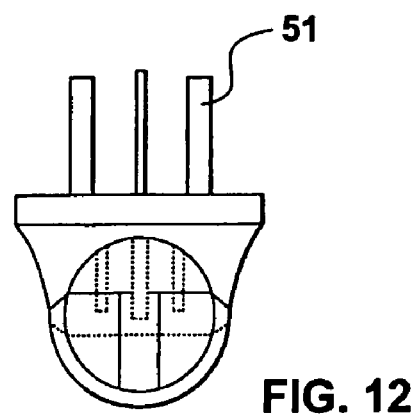
FIG. 12 is a top plan view of a wall adaptor plug.
Figure 13:
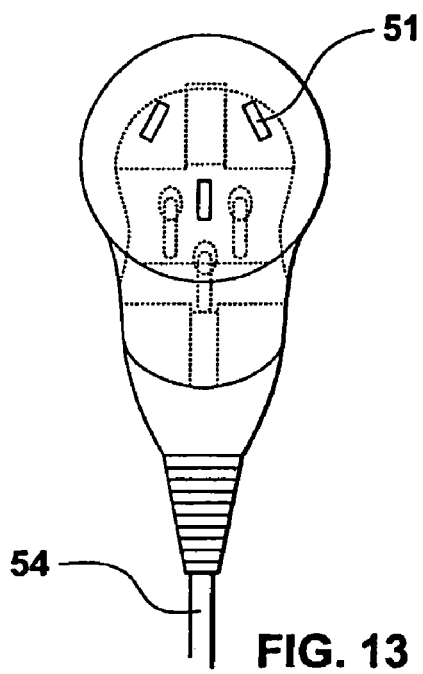
FIG. 13 is a front view of the wall adaptor plug of FIG. 12.
Figure 14:
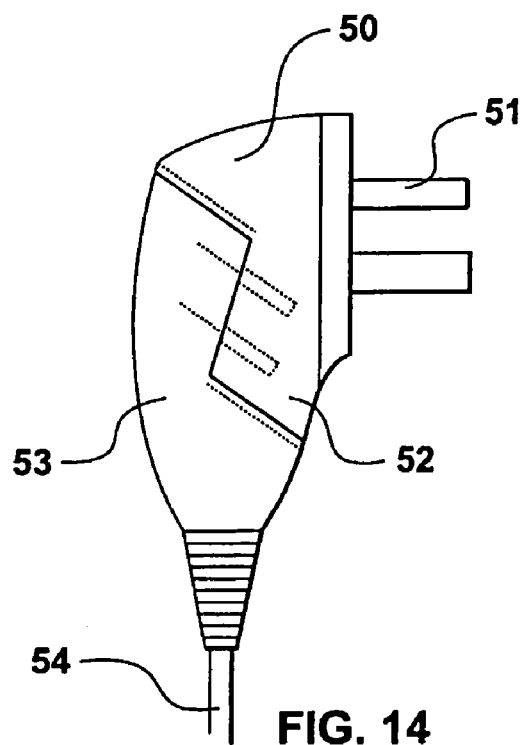
FIG. 14 is a side view of the wall adaptor plug of FIG. 12.

FIGS. 12, 13 and 14 show a wall adaptor 50, in which a connector pair of this invention forms part of a translation device 50 enabling it to be connected to a three pin plug 51 which in turn can connect to a three pin socket (not shown), of the style conventionally used in New Zealand and Australia for 240 volts mains power. Of course other translation devices can be used depending upon the type of conventional plug or socket arrangement used in other countries.

This adaptor 50 is characterised by the fact that the face of the plug has a pre-existing pin pattern 51 for connection to a pre-existing socket (in this case the three pin socket) but that the rear face of the plug contains a female connector part 52, and a power cable has a male connector part 53 of this invention, so that it has the characteristic tight coupling of this invention if a force is applied along the power cord 54. It will be noted that the power cord and male connector part, are arranged to be situated in such a way that the power cord will extend at substantially right angles to the conventional three pin plug, so that any force on the cable in a downward direction as shown in FIGS. 13 and 14 would cause the male part 53 to adhere more tightly to the female part 52 of the connector pair of this invention, whilst at the same time is unlikely to pull the conventional three pins out of the conventional three pin socket.

Variations

Various other alterations and modifications can be made to the foregoing without departing from the scope of this invention. It will be noted that there are numerous other pin/socket configurations which could be used, and that the male or female part may be fitted to form an integral part of an apparatus, product or tool, or may form part of an extension lead. Also by using the connector pair of this invention particularly on power tools, it is practical to then provide a power lead, one end forming part of the connector pair of this invention, and the other end having a plug or socket designed to fit into the plug or socket used in a particular country. Similarly it is possible to provide an extension cord with the connectors of this invention provided at either end thereof, and "translation connectors" enabling the connector pair of this invention to interface with a conventional plug or socket of a particular country.

The invention claimed is:

1. A first connector capable of forming part of a connector pair for detachably connecting two ends of cables, cords, optical fibres or hoses, said first connector comprising
at least one male coupling part capable of being connected to a second connector provided with at least one complementary coupling part such that, in use, when the first connector is coupled to the second connector an electric current or a light signal or a fluid can pass the connector pair, a pointing direction of the at least one male coupling part is at an acute angle to the corresponding end and the coupling parts are positioned in relation to the two ends in such a manner that a pulling force, exerted to the two ends, will change a partial coupling between the first connector and the second connector into a complete coupling, the first connector comprises a shell, on one end operationally connected to a cord end, on substantially the opposite end provided with a nose end surface, which is split into two nose end half surfaces, one half being situated at the end of the shell and the other half being displaced toward the cord end, such that both nose end halves are positioned mutually parallel and that they are connected by a base surface onto or into which the at least one coupling part is mounted substantially parallel to the nose end surface halves.

2. The first connector as claimed in claim 1, wherein the first connector is situated on or forms part of a device such as an electrical tool.

3. A second connector complementary to the first connector of claim 1, wherein said second connector has a female coupling part, and an angle between a corresponding end and a primary direction of a female coupling part is an acute angle.

4. A multiple connector having a plurality of sockets, wherein one or more of the sockets is the second connector as claimed in claim 3, wherein at least some of the sockets are connected together.

5. A connector pair for detachably connecting two ends of cables, cords, optical fibres or hoses, the connector pair comprising
a first connector with at least one male coupling part having a pointing direction at an acute angle to a corresponding end and a second connector with at least one female coupling part, such that for a coupled first and second connector an electric current or a light signal or a fluid can pass the connector pair, the male and the female coupling part being positioned in relation to the two ends in such a manner that a pulling force, exerted to the two ends, will change a partial coupling between the first connector and the second connector into a complete coupling, each connector comprises a shell, on one end operationally connected to a cord end, on substantially the opposite end provided with a nose end surface, which is split into two nose end half surfaces, one half being situated at the end of the shell and the other half being displaced toward the respective cord end, such that both nose end halves are positioned mutually parallel and are connected by a base surface onto or into which the at least one respective coupling cart is mounted substantially parallel to the nose end surface halves.

6. A connector suitable to be used as part of a connector pair as claimed in claim 5.

7. An electrical cord connector or coupling socket according to claim 6.

8. An apparatus provided with a connector, fit for being connected to a connector according to claim 5.

9. An apparatus provided with a connector, fit for being connected to a connector according to claim 7.

\* \* \* \* \*